US012711828B2

(12) United States Patent
Mande et al.

(10) Patent No.: US 12,711,828 B2
(45) **Date of Patent: *Aug. 18, 2026**

(54) SYSTEMS AND METHODS FOR TWO-WAY CASH RECYCLER

(71) Applicant: Wells Fargo Bank, N.A., San Francisco, CA (US)

(72) Inventors: Christian Mande, Charlotte, NC (US); Darren Goetz, San Francisco, CA (US); Frank DiGangi, San Francisco, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/586,807

(22) Filed: Feb. 26, 2024

(65) Prior Publication Data

US 2024/0203189 A1 Jun. 20, 2024

Related U.S. Application Data

(63) Continuation of application No. 17/206,372, filed on Mar. 19, 2021, now Pat. No. 11,915,540.

(51) Int. Cl.

| | |
|---|---|
| ***G07D 11/18*** | (2019.01) |
| ***G07D 11/225*** | (2019.01) |
| ***G07D 11/40*** | (2019.01) |

(52) U.S. Cl.
CPC ........... *G07D 11/18* (2019.01); *G07D 11/225* (2019.01); *G07D 11/40* (2019.01); *B65H 2301/4191* (2013.01); *B65H 2701/1912* (2013.01)

(58) Field of Classification Search
CPC ...... G07D 11/18; G07D 11/225; G07D 11/40; B65H 2301/4191; B65H 2701/1912; G07F 19/20; G07F 19/203; G07F 19/202
See application file for complete search history.

(56) References Cited

U.S. PATENT DOCUMENTS

| | | | | |
|---|---|---|---|---|
| 4,890,824 | A * | 1/1990 | Uchida | G07D 11/40 271/7 |
| 6,607,124 | B1 | 8/2003 | Junkins et al. | |
| 6,695,307 | B2 | 2/2004 | Kanagawa | |
| 6,719,120 | B2 | 4/2004 | Kato | |
| 7,216,591 | B2 | 5/2007 | Katou et al. | |
| 8,600,842 | B1 | 12/2013 | Sanders et al. | |
| 8,893,959 | B1 * | 11/2014 | Graef | G07D 11/24 235/379 |
| 10,275,974 | B2 * | 4/2019 | Koga | B65H 31/10 |
| 11,915,540 | B1 * | 2/2024 | Mande | G07D 11/225 |
| 2010/0168903 | A1 | 7/2010 | Aas et al. | |

* cited by examiner

*Primary Examiner* — Jeremy R Severson
(74) *Attorney, Agent, or Firm* — Foley & Lardner LLP

(57) ABSTRACT

A two-way cash recycler system includes a vault structured to store, receive, and dispense transaction media, a first input/output device structured to receive and dispense the transaction media, a second input/output device structured to receive and dispense the transaction media, and a transport system structured to transport the transaction media within the transaction system using one or more pathways, the one or more pathways connecting the first input/output device to at least one of the second input/output device or the vault.

19 Claims, 7 Drawing Sheets

SYSTEMS AND METHODS FOR TWO-WAY CASH RECYCLER

CROSS-REFERENCE TO RELATED APPLICATION

This application is a continuation of U.S. patent application Ser. No. 17/206,372, filed Mar. 19, 2021, the contents of which are incorporated herein by reference in its entirety and for all purposes.

TECHNICAL FIELD

The present disclosure relates to systems and methods for a two-way cash recycler.

BACKGROUND

Automated cash handling devises such as automatic teller machines (ATMs), cash dispensers, cash recyclers, and the like are a convenient way for customers to complete financial transactions, including document deposits, withdrawals, and exchanges. Automated cash handling devices may be placed and accessed by customers at various geographic locations, such as bank locations, stores, or other point of sale (POS) locations to facilitate financial transactions such as sales, deposits, or withdrawals. Typical cash handling devices may be capable of facilitating only one transaction type for one user at a time. For example, a typical cash handling device may require transactions for more than one user to be performed sequentially.

SUMMARY

At least one arrangement relates to a transaction system. The transaction system includes a vault having disposed therein a plurality of media cassettes, each of the plurality of media cassettes structured to store, receive, and dispense transaction media therefrom. The transaction system also includes a first input/output panel disposed on a first side of the transaction system. The first input/output panel includes a first media aperture structured to receive and dispense the transaction media. The transaction system also includes a second input/output panel disposed on a second side of the transaction system. The second input/output panel includes a second media aperture structured to receive and dispense the transaction media. The transaction system also includes a transport system disposed between the first side and the second side. The transport system is structured to transport the transaction media within the transaction system using a plurality of pathways. The plurality of pathways includes a pass-through pathway structured to transport the transaction media between the first media aperture and the second media aperture. The plurality of pathways also includes a concurrent use pathway structured to transport the transaction media from at least one of the first media aperture and the second media aperture to the vault. The plurality of pathways also includes a dispense pathway structured to transport the transaction media from the vault to at least one of the first media aperture and the second media aperture.

Another arrangement relates to a method of facilitating a transaction. The method includes receiving, by a transaction device, a user input. The user input is configured to indicate a transaction type. The transaction type includes at least one of a concurrent use transaction, a pass-through transaction, and a dispensing transaction. The method further includes facilitating, responsive to the user input, the concurrent use transaction. The concurrent use transaction includes receiving, by a first deposit pocket on a first side of the transaction device, a first set of transaction media. The concurrent use transaction also includes receiving, by a second deposit pocket on a second side of the transaction device, a second set of transaction media. The concurrent use transaction also includes transporting, by a transport system, the first set of transaction media and the second set of transaction media to a media vault. The method further includes facilitating, responsive to the user input, the pass-through transaction. The pass-through transaction includes receiving, by the first deposit pocket, a third set of transaction media. The pass-through transaction also includes transporting, by the transport system, the third set of transaction media from the first deposit pocket to a second media output on the second side. The pass-through transaction also includes receiving, by the second deposit pocket, a fourth set of transaction media. The pass-through transaction also includes transporting, by the transport system, the fourth set of transaction media from the second deposit pocket to a first media output on the first side. The method also includes facilitating, responsive to the user input, the dispensing transaction. The dispensing transaction includes picking, by a picking system of the transport system, a fifth set of transaction media from the media vault. The dispensing transaction also includes transporting, by the transport system, the fifth set of transaction media to the first media output.

Another arrangement relates to a non-transitory computer readable medium having computer-executable instructions embodied therein that, when executed by at least one processor of a computing system, cause the computing system to perform operations to complete a transaction. The operations include receiving a first user input indicating a transaction type for the transaction. The transaction includes at least one of a concurrent use transaction, a pass-through transaction, and a dispensing transaction. The operations further include performing concurrent transaction operations based on the first user input indicating that the transaction type is a concurrent transaction. The concurrent transaction operations include receiving a first deposit notification from a first deposit pocket sensor, the first deposit notification indicating that a first transaction media was placed in a first deposit pocket. The concurrent transaction operations also include receiving a second deposit notification from a second deposit pocket sensor, the second deposit notification indicating that a second transaction media was placed in a second deposit pocket. The concurrent transaction operations also include causing the transport system to transport the first transaction media and the second transaction media to a media vault. The operations further include performing pass-through transaction operations based on the first user input indicating that the transaction type is a pass-through transaction. The pass-through transaction operations include receiving a third deposit notification from the first deposit pocket sensor, the third deposit notification indicating that a third transaction media was placed in the first deposit pocket. The pass-through transaction operations also include causing the transport system to transport the third transaction media from the first deposit pocket to the second deposit pocket. The pass-through transaction operations also include receiving a fourth deposit notification from the second deposit pocket sensor, the fourth deposit notification indicating that a fourth transaction media was placed in the second deposit pocket. The pass-through transaction operations also include causing the transport system to transport the fourth transaction media from the second deposit pocket to the first deposit pocket. The operations further include performing dispensing transaction operations based on the first user input indicating that the transaction type is a dispensing transaction. The dispensing transaction operations include causing the transport system to transport a fifth transaction media from the media vault to at least one of the first deposit pocket and the second deposit pocket.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
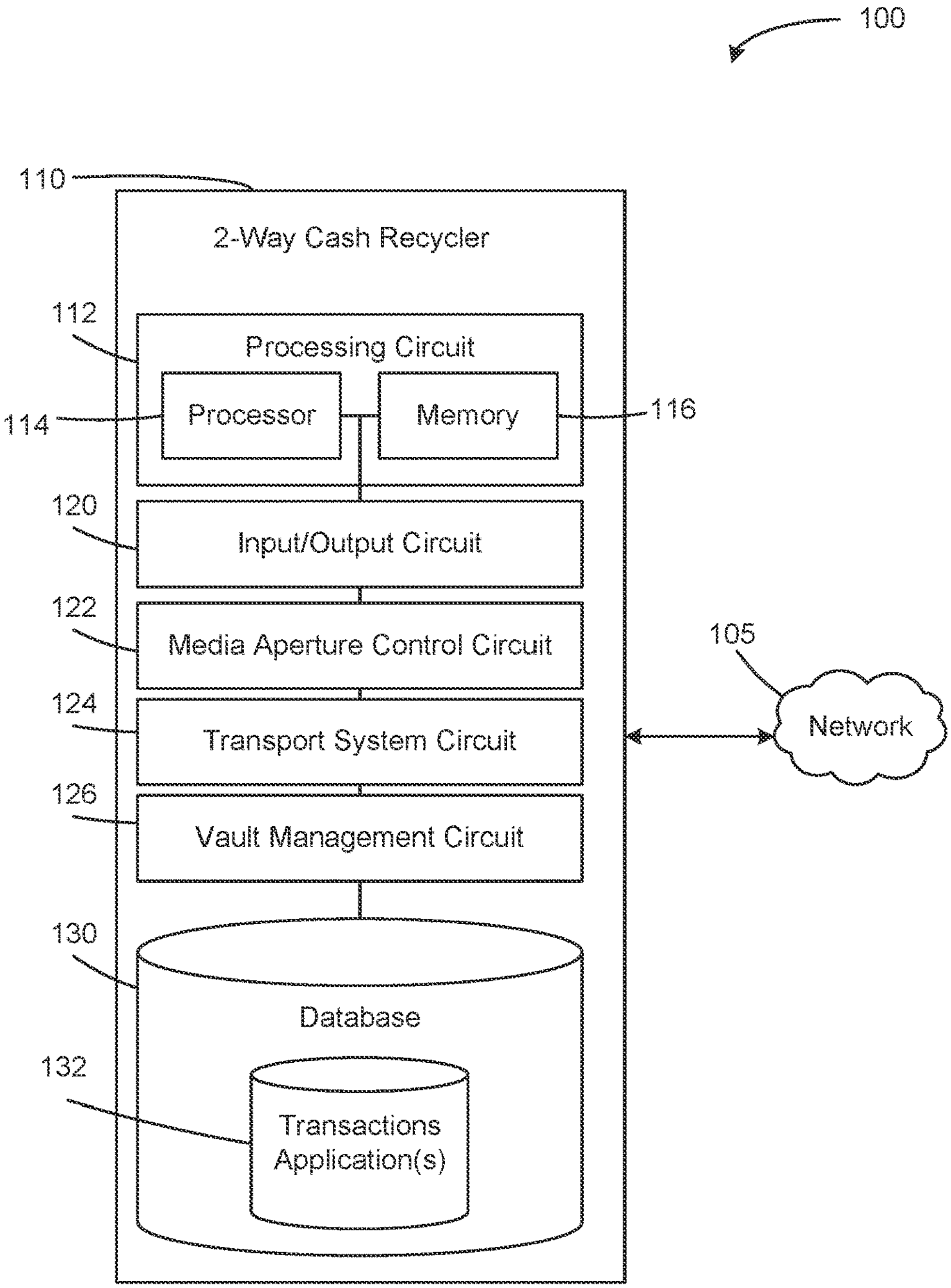
FIG. 1 is a component diagram of a computing system for a two-way cash recycler system, according to an example arrangement.

Referring generally to the figures, systems and methods for a two-way cash recycler system are disclosed. The systems and methods described herein provide a technical improvement to solve the technical problem of facilitating multiple transaction types and/or facilitating concurrent multi-user transactions. The two-way cash recycler system, according to an example arrangement, includes control circuitry structured receive a request to facilitate one or more of a plurality of transaction types. The transaction types can involve one or more of receiving, storing, and dispensing transaction media, such as banknotes, checks, and the like. The transactions can be performed concurrently by more than one user. Further, the control circuitry is structured to control a transport system having a plurality of passages. Each of the plurality of passages is structured to facilitate transporting the transaction media within the two-way cash recycler system and to facilitate one or more transaction types. The control circuitry is structured to selectively utilize the plurality of passages based, for example, on the requested transaction type, media source, user, and/or a characteristic of a media cassette installed therein (e.g., denomination, online/offline status, fill level, media sanitizing status, etc.).

In some arrangements, the systems and methods described herein provide a technical improvement to solve the technical problem of verifying the legitimacy and usability of transaction media. The two-way cash recycler system includes one or more sensors configured to detect one or more characteristics (e.g., legitimacy, integrity, value, routing number, account number) of the transaction media. The control circuitry is structured to receive sensor data from the one or more sensors and determine one or more of (a) whether the transaction media is counterfeit or legitimate, (b) whether the transaction media has any defects, (c) a value of the transaction media, (d) a routing number associated with the transaction media, and/or (e) an account number associated with the transaction media. The two-way cash recycler system may also include one or more ultraviolet (UV) light sources structured to provide UV-C light on one or more surfaces of the transaction media. The control circuitry is structured to selectively activate the UV light sources to utilize UV-C radiation to sanitize and/or disinfect one or more surfaces of the transaction media.

In some arrangements, the two-way cash recycler system may be configured to perform counting and recycling services. The term "recycling" as used herein refers to receiving transaction media (e.g., paper currency, bank notes, checks) in a first transaction and later dispensing the previously received transaction media in a second transaction. In other cases, instead of recycling the received transaction media, the counter recycling device may receive, deposit, and hold the currency in an escrow area as described throughout.

In an example illustrative scenario, a two-way cash recycler system includes a first user interface panel, a second user interface panel, a transport system including transport hardware and control circuitry, and a transaction media vault structured to retrievably store physical transaction media. The two-way cash recycler system may receive a transaction request via one of the user interface panels. In some arrangements, the transaction request may include a sequential transaction involving one of depositing transaction media or withdrawing transaction media. In some arrangements, the transaction request may include one or more transaction types including a concurrent use transaction, a pass-through transaction, and a dispensing transaction, as described further herein. That is, the two-way cash recycler system may facilitate the one or more transactions concurrently, partially concurrently, or sequentially.

In some arrangements, the concurrent use transaction may include one or more users using the two-way cash recycler system to complete one or more transactions concurrently or partially concurrently. In an example, a concurrent use transaction may include the two-way cash recycler system facilitating two separate deposit transactions for two unique users concurrently or partially concurrently.

In some arrangements, the pass-through transaction may include transporting, by the transport system, transaction media from a first user (e.g., accountholder, depositor) on a first side of the two-way cash recycler system to a second user (e.g., teller, merchant) on a second side of the two-way cash recycler system, and vice versa. For example, the two-way cash recycler system may receive a request for a pass-through transaction. The two-way cash recycler system may receive a first set of transaction media at the first user interface panel and transport the first set of transaction media to the second user interface panel. The two-way cash recycler system may receive a second set of transaction media at the second user interface panel and transport the second set of transaction media to the first user interface panel.

The two-way cash recycler system may be configured to be positioned at a service counter (e.g., a checkout counter at a retail store, a checkout counter at a grocery store, a teller counter at a bank), in a particular a service area (e.g., a lobby of a bank, a customer service area of a service provider, a merchant), or a service desk (e.g., a desk of a provider employee).

Before turning to the figures, which illustrate certain example arrangements in detail, it should be understood that the present disclosure is not limited to the details or methodology set forth in the description or illustrated in the figures. It should also be understood that the terminology used herein is for the purpose of description only and should not be regarded as limiting.

FIG. 1 is a component diagram of a computing system 110 for a two-way cash recycler system 100, according to an example arrangement. In some arrangements the two-way cash recycler system 100 is associated with a service provider such as a business, a financial institution, and the like. As described above, the two-way cash recycler system 100 can include a first user interface panel, a second user interface panel, a transport system including transport hardware and control circuitry, and a transaction media vault structured to retrievably store physical transaction media. Additionally, and as shown in FIG. 1, the two-way cash recycler system 100 includes a computing system 110, which may include any of transitory storage media, non-transitory storage media, hardware- and/or software-based circuitry, memory, and processor(s). The two-way cash recycler system 100 is communicatively coupled to a network 105. Specifically, the computing system 100 is communicatively coupled to the network 105 such that the network 105 permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the computing system 110 and other computing systems associated with the service provider or with a customer of the provider. The network 105 may include one or more of a cellular network, the Internet, Wi-Fi, Wi-Max, a proprietary provider network, a proprietary retail or service provider network, and/or any other kind of wireless or wired network.

In some arrangements, the computing system 110 is positioned, at least in part, within the two-way cash recycler system 100. In some arrangements, the computing system 110 access and/or controls the two-way cash recycler system 100 from a remote location (e.g., a computer, server coupled to the network 105). The computing system 110 includes a processing circuit 112, an input/output (I/O) circuit 120, one or more specialized processing circuits shown as a media aperture control circuit 122, a transport system control circuit 124, and a vault management circuit, and a database 130. The processing circuit 112 may be coupled to the input/output device 120, the specialized processing circuits, and/or the database 130. The processing circuit 112 may include a processor 114 and a memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the computing system 110 is configured to run a variety of application programs and store associated data in a database of the memory 116 (e.g., database 130).

The input/output circuit 120 is structured to receive communications from and provide communications to other computing devices, users, and the like associated with the computing device 110. The input/output circuit 120 is structured to exchange data, communications, instructions, and the like with an input/output component of the computing device 110. In some arrangements, the input/output device 120 includes communication circuitry for facilitating the exchange of data, values, messages, and the like between the input/output device 120 and the components of the computing device 110. In some arrangements, the input/output device 120 includes machine-readable media for facilitating the exchange of information between the input/output circuit 120 and the components of the computing device 110. In some arrangements, the input/output circuit 120 includes any combination of hardware components, communication circuitry, and machine-readable media.

In some arrangements, the I/O circuit 120 may include a network interface. The network interface may be used to establish connections with other computing devices by way of the network 105. The network interface may include program logic that facilitates connection of the computing device 110 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). In some arrangements, the I/O circuit 120 includes an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

In some arrangements, the I/O circuit 120 includes suitable input/output ports and/or uses an interconnect bus (e.g., bus 402 in FIG. 7) for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 120 may provide an interface for the user to interact with various applications (e.g., transaction application(s)) stored on the computing device 110. For example, the input/output circuit 120 may include a keyboard, a keypad, a mouse, joystick, a touch screen, a microphone, a biometric device, a virtual reality headset, smart glasses, and the like. As another example, input/output circuit 120, may include, but is not limited to, a television monitor, a computer monitor, a printer, a facsimile, a speaker, and so on.

In some arrangements, the I/O circuit 120 may include one or more I/O devices positioned on an input/output panel (shown as user interface panel 210, 212 in FIG. 2) of the two-way cash recycler system 100. The I/O circuit 120 may include a screen or touchscreen device configured to display a status of the two-way cash recycler, a selection menu, and the like. The I/O circuit 120 may also include one or more user interaction points configured to receive a user input or provide an output. The user interaction points may include a keypad (physical and/or touchscreen), a near field communication device, a card reader, a biometric sensor, a receipt printer, and the like. In some arrangements, the I/O circuit 220 may be structured to authenticate a user of the two-way cash recycler system 100 via one or more of the user interaction points. For example, the I/O circuit 220 may be structured to receive a token. The token can be physical, such as an identification (ID) token such as an ID card, a bank card, a store membership card, a gift card, a ticket, and the like. The token can be virtual, such as a digitized customer biometric, a cryptographically protected value (numerical, alphanumeric, inclusive of special characters, etc.), and/or an account, accountholder, employee or merchant identifier obtained by allowing the user to scan a physical ID, provide a QR code via image capturing, or provide an electronic message via near-field communication (NFC).

The I/O circuit 120 may further include a transaction device such as a transaction media receiver and/or a transaction media dispenser. The transaction device may include hardware and/or software that is structured to facilitate receiving and/or dispensing transaction media.

The memory 116 may store a database 130, according to some arrangements. The database 130 may be configured to store one or more applications. For example, the database 130 stores one or more transaction application(s) 132. The transaction application(s) 132 may include one or more of a concurrent use transaction application, a pass-through transaction application, and a dispensing transaction application. In some arrangements, the transaction application(s) 132 may be incorporated with an existing application in use by the computing device 110. In some arrangements, the transaction application(s) 132 is a separate software application implemented on the computing device 110. The transaction application(s) 132 may be downloaded by the computing device 110 prior to its usage, hard coded into the memory 116 of the processing circuit 112, or be a network-based or web-based interface application such that the computing system 110 may provide a web browser to access the application, which may be executed remotely from the computing system 110. Accordingly, the computing system 110 may include software and/or hardware capable of implementing a network-based or web-based application. For example, in some instances, the transaction application(s) 132 includes software such as HTML, XML, WML, SGML, PHP (Hypertext Preprocessor), CGI, and like languages.

In the latter instance, a user (e.g., a provider employee, a customer of the provider) may have to log onto or access the web-based interface before usage of the application. In this regard, the transaction application(s) 132 may be supported by a separate computing system including one or more servers, processors, network interface, and so on, that transmit applications for use to the computing system 110.

Figure 3:
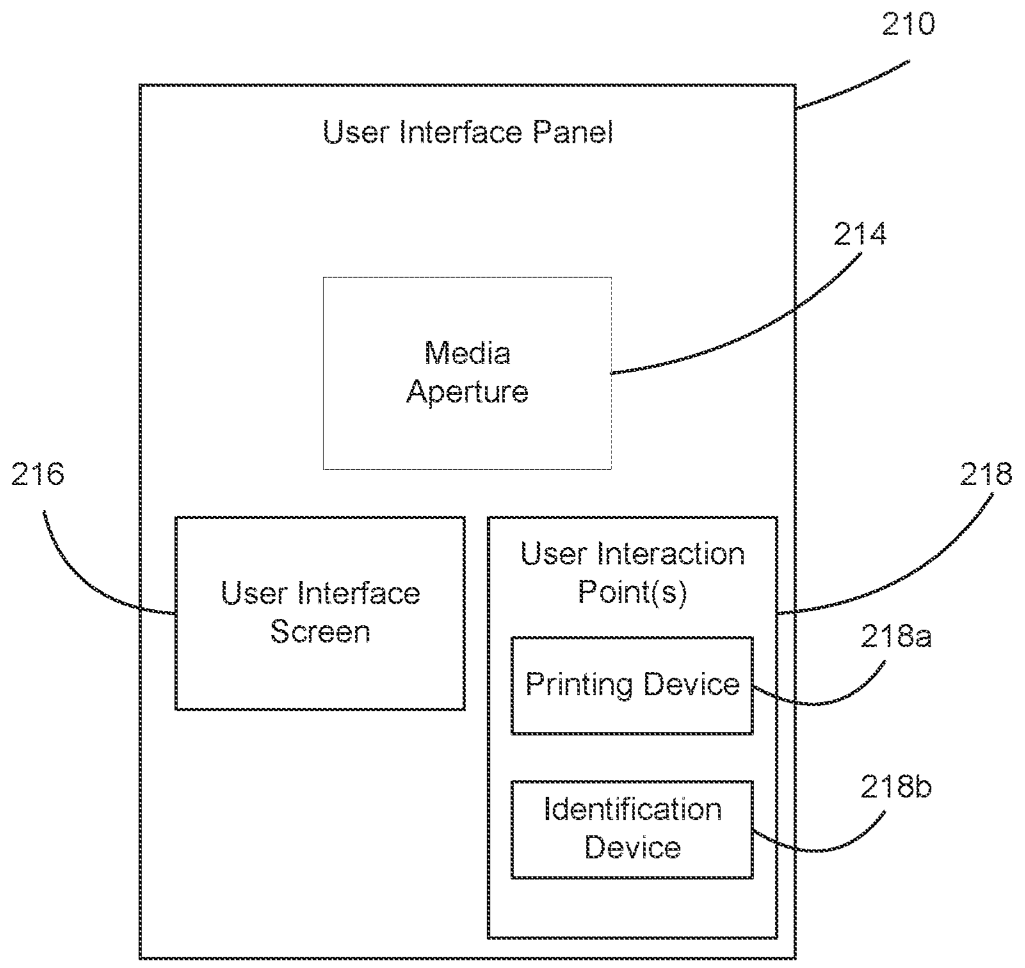
FIG. 3 is a component diagram of an interface panel of the two-way cash recycler system of FIG. 1, according to an example arrangement.

The media aperture control circuit 112 is configured facilitate the operation of one or more hardware-based portals (e.g., openings, slots, and so forth, shown as media aperture 214 in FIG. 3) positioned on the two-way cash recycler system 100. The transport system of the two-way cash recycler system 100 is structured to receive and/or dispense transaction media (e.g., banknotes, coins, checks) via the one or more portals. In some arrangements, the media aperture control circuit 112 is configured to access and/or execute one or more transaction application(s) 132. The one or more transaction application(s) 132 may include machine readable instructions that, when executed by the media aperture control circuit 112, facilitate receiving and/or dispensing transaction material by the one or more portals. In some arrangements, the media aperture control circuit 112 is also configured to facilitate the operation of one or more I/O devices (shown as user interaction point(s) 218 in FIG. 3) positioned on the two-way cash recycler system 100.

The transport system circuit 124 is configured facilitate the operation of a transaction media transportation system (shown as transport system 220 in FIG. 2) positioned within the two-way cash recycler system 100. The transaction media transportation system may include hardware and/or control circuitry structured to transport transaction media within the two-way cash recycler system 100. In some arrangements, the transport system circuit 124 is configured to access and/or execute one or more transaction application (s) 132. The one or more transaction application(s) 132 may include machine readable instructions that, when executed by the transport system circuit 124, facilitate transporting transaction material within the two-way cash recycler system 100.

The vault management circuit 126 is configured facilitate the operation of a transaction media storage system (shown as vault 230 in FIG. 2) positioned within the two-way cash recycler system 100. The storage system may include hardware and/or control circuitry structured to retrievably store transaction media within the two-way cash recycler system 100. In some arrangements, the vault management circuit 126 is configured to access and/or execute one or more transaction application(s) 132. The one or more transaction application(s) 132 may include machine readable instructions that, when executed by the transport system circuit 124, facilitate storing, sorting, and/or retrieving items from the storage system.

Figure 2:
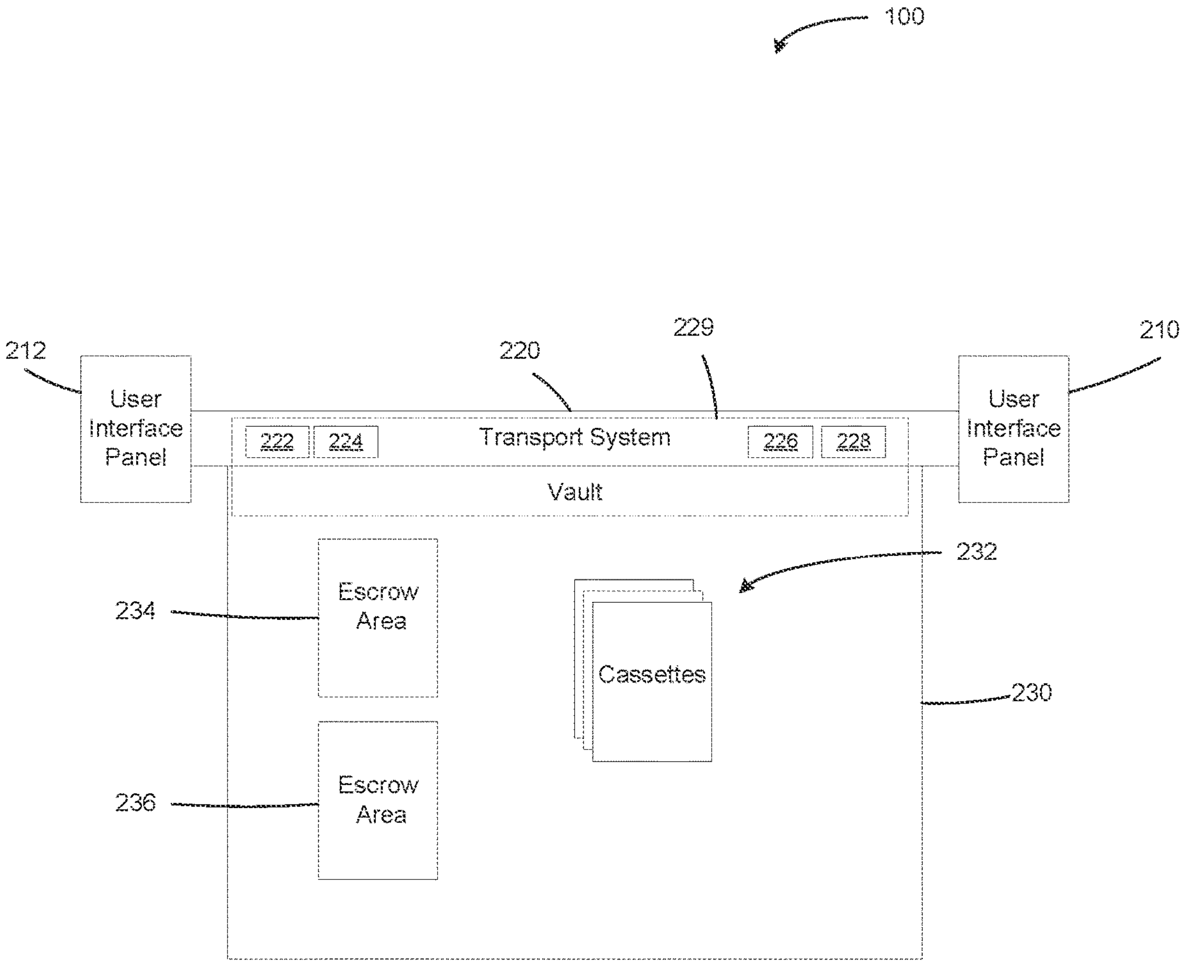
FIG. 2 is a component diagram of the two-way cash recycler system of FIG. 1, according to an example arrangement.

FIG. 2 is another view of a component diagram of the two-way cash recycler system 100 of FIG. 1, according to an example arrangement. As shown, the two-way cash recycler system 100 includes a first user interface panel 210 on a first side of the two-way cash recycler system 100 and a second user interface panel 212 on a second side of the two-way cash recycler system 100. In some arrangements, the first side is positioned substantially opposite the second side. In some arrangements, the first side and the second side are positioned such that the first side and the second side do not spatially overlap. The two-way cash recycler system 100 also includes a vault 230 that is positioned between the first side and the second side. The two-way cash recycler system 100 also includes a transport system 220 that is coupled to the first user interface panel 210, the second user interface panel 212 such that the transport system, and the vault 230.

The first user interface panel 210 and the second user interface panel 212 are configured to facilitate user interaction with the two-way cash recycler system 100. For example, the first user interface panel 210 and the second user interface panel 212 may include one or more portals configured to receive and/or dispense transaction media. The first user interface panel 210 and the second user interface panel 212 may also include one or more I/O devices such as a display, a touchscreen, or a card reader configured to receive user input and/or provide a machine output.

The transport system 220 is disposed between the first side and the second side (such that, for example, the transport system 220 connects the first side and the second side). The transport system 220 includes hardware-based conduit (s) structured to transport the transaction media within the two-way cash recycler system 100 using a plurality of pathways. The transport system circuit 124 may be configured to access the transaction application(s) 132 and control the transport system 220.

The two-way cash recycler system 100 may include sensors 222, 224, 226 configured to detect data associated with the transaction media. The sensors 222, 224, 226 may be communicatively coupled to the computing device 110 of FIG. 1. In some arrangements, and as shown in FIG. 2, the sensors 222, 224, 226 are disposed within the transport system 220. In some arrangements, the sensors 222, 224, 226 may be positioned on the user interface panel 210, or within the vault 230.

In some arrangements, each of the sensors 222, 224, 226 include processing circuits configured to determine a characteristic (e.g., legitimacy, value, routing number, and account number) of the transaction media based on detected sensor data. In some arrangements, the sensors are configured to transmit the sensor data to the computing device 110, and the computing device 110 is configured to determine a characteristic of the transaction media based on detected sensor data. For example, the third sensor 226 may detect a first characteristic of the transaction media (e.g., a failed transaction due to a jammed media deposit). The third sensor 226 may generate a media data packet including an indication of the first characteristic and provide the media data packet to the computing device 110 (e.g., via the I/O circuit 120, the media aperture control circuit 122, the transport system circuit 124). The computing device 110 may generate a notification of the first characteristic and based on the media data packet. The computing device 110 may also provide the notification to the network 105 such that other device connected to the network can receive the notification. In some arrangements, the computing device 110 may also generate a graphical user interface indicating the first characteristic.

A first sensor 222 may be configured as an optical character recognition (OCR) sensor structured to detect a one or more characters on the transaction media and determine one or more characteristics based on the characters. For example, the OCR sensor may detect number on the transaction media and determine a financial institution, a value, an account number, and/or a routing number of the transaction media. The OCR sensor may also detect letters or other characters and determine a name, date, and the like associated with the transaction media. The first sensor 222 may be configured to provide an indication of the detected value, account number, routing number, names, and/or dates, associated with the transaction media. Based on any of this information, the computing device 110 can automatically post the media-based transaction.

A second sensor 224 may be configured as a counterfeit sensor structured to detect anti-counterfeit markers on the transaction media. For example, the counterfeit sensor may be configured to detect an anti-counterfeit pattern or texture on a banknote. The second sensor 224 may be configured to provide an indication of whether the transaction media is legitimate or counterfeit based on the sensor data. In some arrangements, the second sensor 224 may also be structured to detect the integrity of the transaction media. For example, the second sensor 224 may detect if the transaction media has tears, missing portions, erroneous markings and/or other physical defects.

A third sensor 226 may be configured as a jammed media sensor structured to detect whether any of the transaction media is jammed within the transport system. For example, the jammed media sensor may be configured to detect if one or more pieces of transaction media is stuck within the transport system. The third sensor 226 may be configured to provide an indication of whether the any of the transaction media is jammed within the transport system.

The transport system 220 may also include one or more ultraviolet (UV) light source 228. The transport system 220 may be configured to transport each piece of the transaction media past the ultraviolet light source 228. The UV light may be positioned and/or structured to provide ultraviolet light such that each piece of transaction media that passes the UV light source 228 is substantially exposed to UV on one or more surfaces of the transaction media.

The ultraviolet (UV) light source 228 is structured to be operable between an on state where the UV light source provides UV light/radiation and an off state where the UV light source does not provide UV light/radiation. The transport system circuit 124 may be structured to selectively operate the UV light source 228. For example, the transaction application(s) 132 may include instructions to perform sanitation operations on the transaction media as the transaction media is transported by the transport system 220. The sanitation operations may include providing UV light/radiation on one or more sides of the transaction media as the transaction media is transported by the transport system 220.

The transaction application(s) 132 may be configured to facilitate a concurrent use transaction when more than one user (e.g., customer of the provider) are using the two-way cash recycler system 100 concurrently at least in part (such that the operations initiated by the users overlap at least in part) to pass transaction media to/from the first user interface panel 210, the second user interface panel 212, and/or the vault 230 through a first pathway, and to the first user interface panel 210, the second user interface panel 212, and/or the vault 230. The concurrent use transaction may also include facilitating two or more transactions concurrently or at least in part (such that one or more operations initiated by a single user overlap at least in part) to pass transaction media to/from the first user interface panel 210, the first user interface panel 210, the second user interface panel 212, and/or the vault 230 through a first pathway, or to the first user interface panel 210, the second user interface panel 212, and/or the vault 230.

The transaction application(s) 132 may facilitate a pass-through transaction when a first user wants to pass transaction media from the first user interface panel 210, through a second pathway, and to the second user interface panel 212. The transaction application(s) 132 may also be configured to facilitate receiving a first transaction media from the first user interface panel 210, storing the first transaction media in the vault 230, retrieving a second transaction media, different from the first transaction media, from the vault 230 that is equivalent in value to the first transaction media, and providing the second transaction media to the second user interface panel 212. In some arrangements, the transaction application(s) 132 may provide a technical improvement by facilitating sanitization operations during the pass-through transaction such that the first transaction media and/or the second transaction media is sanitized by the UV light/radiation provided by the UV light source 228.

The transaction application(s) 132 may facilitate dispensing transaction media from the vault 230, through a third pathway, and to the first user interface panel 210 and/or the second user interface panel 212.

The transaction application(s) 132 may facilitate a payment ticket transaction. The payment ticket transaction may include receiving transaction media including a payment ticket (e.g., a parking ticket) at one or both of the first user interface panel 210 and the second user interface panel 212. The transport system 220 may be configured to retrieve the payment ticket from the first user interface panel 210 and/or the second user interface panel 212 and provide the payment ticket to a payment ticket holding area within the vault 230. The computing device 110 may determine (e.g., via sensors 222, 224, 226) a payment amount based on a media data packet associated with the payment ticket. In some arrangements, the transaction application(s) 132 may facilitate generating a payment ticket user interface that includes a depiction of the payment amount and a text or a graphic indicating that the user can pay the ticket. The payment ticket transaction may also include receiving funds from a user. The funds may include transaction media such as banknotes, coins, and checks and/or a card payment from a credit card, a debit card, a smartphone/smartwatch, and the like. The transaction application(s) 132 may further facilitate updating the payment ticket user interface with an indication of a received amount of funds, and/or other payment characteristics related to the payment ticket transaction.

In some arrangements, the transport system 220 may also include a picking system structured to retrieve transaction media from the vault 230. The picking system may include one or more of rollers, transport belts, gears (e.g., gear trains, rack and pinion, worm gears), and the like. In some arrangements, the picking system may be structured to selectively couple to one or more cassettes 232 positioned in the vault 230. In some arrangements, the picking system may include one or more picking arms structured to selectively interface and/or couple to one or more of the first user interface panel 210, the second user interface panel 212, the vault 230, one or more of the cassettes 232, the first escrow area 234, and the second escrow area 236. In some arrangements, a picking arm may be configured as a robotic arm structured to provide and/or retrieve transaction media to/from one or more of the first user interface panel 210, the second user interface panel 212, the vault 230, one or more of the cassettes 232, the first escrow area 234, and the second escrow area 236. In some arrangements, the picking arms may be configured as a roller assembly. In one example arrangement, the roller assembly may be structured to selectively couple to one or more cassettes 232 and provide and/or retrieve transaction media to/from the cassettes 232. In one example arrangement, each of a plurality of roller assemblies is structured to couple to each of the cassettes 232. In some arrangements, the transport system 220 and/or the picking system may include other transport hardware structured to facilitate transporting the transaction media within the two-way cash recycler system 100. The picking system may also include some or all of the sensors 222, 224, 226.

The one or more cassettes 232 can be structured and operate similarly to the universal cash cassette for recirculation in multiple systems, disclosed in U.S. patent application Ser. No. 17/205,587 Filed Mar. 18, 2021, incorporated herein by reference in its entirety.

In some arrangements, two-way cash recycler system 100 also includes a sensor escrow area 229. The sensor escrow area 229 may be positioned between the first side and the second side of the two-way cash recycler system 100. In some arrangements, the sensor escrow area 229 is accessible via the transport system 220. In some arrangements, the sensor escrow area 229 is accessible via the vault 230. The sensor escrow area 229 is configured to contain some or all of the sensors 222, 224, 226 and/or the UV light source 228. The sensor escrow area 229 is configured to receive transaction media from the transport system 220 and/or from the picking system. The sensors 222, 224, 226 are configured to detect sensor data including one or more characteristics of the transaction media when the transaction media passes through the sensor escrow area 229 and provide media data packet(s) including sensor data to the computing system 110. The sensor escrow area 229 is further configured to provide and/or dispense the transaction media to the transport system 220 and/or the picking system.

The vault 230 is configured to retrievably store transaction media. In some arrangements, and as shown in FIG. 2, the vault 230 houses therein a plurality of cassettes 232. The vault 230 also includes a first escrow area 234 and a second escrow area 236. The vault 230 may include one or more cassettes for each type of transaction media. For example, the vault 230 may include one or more cassettes for checks, payment tickets, for each type of banknote, and the like. In an example arrangement, the plurality of cassettes 232 includes at least one banknote cassette for each type of banknote. In some arrangements, one or more of the cassettes are positioned within the first escrow area 234 and/or within the second escrow area 236.

Each of the plurality of cassettes 232 is structured to store, receive, and dispense transaction media therefrom. Each of the plurality of cassettes 232 is removable from the vault 230. The transport system 220 can be configured to sort the transaction media into each of the plurality of cassettes based on a predetermined soring arrangement. For example, the transport system 220 may be configured to sort the banknotes into banknote cassettes based on the type of banknote. In some arrangements, the picking system of the transport system 220 may be configured to retrieve the transaction media from the cassettes 232. For example, the picking system may include a first picker arm structured to pick the transaction media from at least one of the plurality of cassettes and provide the transaction media to the first user interface panel 210, via the transport system 220. A second picker arm of the picking system may be structured to pick the transaction media from at least one of the plurality of cassettes and provide the transaction media to the second media aperture, via the transport system 220. The first escrow area 234 may be accessible from a first set of cassettes of the plurality of cassettes 232. In some arrangements, the first escrow area 234 is structured to receive and store the transaction media. The first escrow area may include hardware structured to sort and deposit the notes into the cassettes 232. In some arrangements, the first escrow area 234 may also include some or all of the sensors 222, 224, 226 of the transport system 220. In some arrangements the first escrow area 234 includes a UV light source 228 of the transport system 220.

The second escrow area 236 may be accessible from a second set of cassettes of the plurality of cassettes 232. The second set of cassettes may be structured to store and dispense the transaction media via the transport system 220 to and from the first user interface panel 210 and/or the second user interface panel 212. In some arrangements, the second escrow area 236 is structured to store and dispense transaction media after the transaction media has been sanitized. In some arrangements, the second escrow area 236 may also include some or all of the sensors 222, 224, 226 of the transport system 220. In some arrangements the second escrow area 236 includes a UV light source 228 of the transport system 220.

In some arrangements, the first escrow area 234 and/or the second escrow area 236 may be configured as a check holding area structured to store, receive, and/or dispense checks. The check holding area may include and/or be coupled to an OCR sensor structured to detect a routing number, an account number, and/or a value for each check received by the check holding area.

In some arrangements, the first escrow area 234 and/or the second escrow area 236 may be configured as a payment ticket holding area. In some arrangements, the vault 230 may include fewer and/or additional escrow areas based on a predetermined method of sorting the transaction media. For example, the vault 230 may include a separate escrow area for each type of banknote, a check escrow area, and a payment ticket or other transaction media escrow area.

FIG. 3 is a component diagram of an interface panel 210 of the two-way cash recycler system 100 of FIG. 1, according to an example arrangement. As shown, the first user interface panel 210 includes a media aperture 214, a user interface screen 216, and one or more user interaction point(s) 218. In some arrangements, the first user interface panel 210 may include more than one media aperture 214 and/or more than one user interface screen 216.

The media aperture 214 is structured to receive and/or dispense transaction media. In some arrangements, the interface panel 210 may include a plurality of media apertures 214. For example, a first media aperture may be structured to receive transaction media and a second media aperture may be structured to dispense transaction media. In some arrangements, each of the first media aperture and the second media aperture are connected to a single escrow area. In other arrangements, the first media aperture and the second media aperture are each connected to a dedicated, separate escrow area. In some arrangements, the first media aperture may be structured to receive and/or dispense a first type of transaction media (e.g., cash) and the second media aperture may be structured to receive and/or dispense a different, second type of transaction media (e.g., checks, tickets, receipts). In some arrangements, the transport system 220 is configured to receive and/or provide the transaction media to/from the media aperture 214. In some arrangements, the picking system of the transport system 220 is configured to receive and/or provide the transaction media to/from the media aperture 214.

In some arrangements, the media aperture 214 includes a media pocket structured to receive the transaction media. The media pocket is structured to receive the transaction media in any orientation, combination, or order. The media pocket may also be structured to provide the transaction media to the transport system 220 and/or components thereof. In some arrangements, the transport system 220 and/or the transaction application(s) 132 may be configured to receive the transaction media from the media pocket and manipulate the transaction media to a predetermined orientation, combination, or order.

In some arrangements, the media aperture 214 and/or the media pocket may include a sensing device such as the sensors 222, 224, 226 of FIG. 2. The sensing device may be configured to sense each transaction media provided to the media aperture 214 and/or the media pocket. The media aperture control circuit 112 may receive sensor data from the sensing device and determine, based on the sensor data, one or more characteristics of each piece of transaction media. As described above, the one or more characteristics may include a media type (e.g., banknotes, coins, checks, payment tickets), a media value (e.g., a cash value), a media verification (e.g., an indication of whether the transaction media is legitimate or counterfeit), a media routing number, and/or a media account number (e.g., from a check). Further, the media aperture control circuit 112 may determine a media type, a media orientation, a media combination, and a media order for each piece of media in the first set of transaction media. In an example arrangement, the media aperture control circuit is configured to provide the one or more media characteristics to the transport mechanism circuit.

In some arrangements, the media aperture 214 includes a media dispensing device structured to receive transaction media from the transport system 220. The media dispensing device may also be configured to receive the transaction media in a particular orientation, combination, or order. In some arrangements, the transport system 220 and/or the transaction application(s) 132 may be configured to provide the transaction media to the media dispensing device in a predetermined orientation, combination, or order. The media dispensing device may dispense the transaction media out of the user interface panel 210 such that a user of the two-way cash recycler system 100 can retrieve the transaction media form the media dispensing device.

The user interface screen 216 is structured to display a transaction graphical user interface (GUI). The transaction GUI may include one or more of a status of the two-way cash recycler system 100, an interactive menu, and the like. In some arrangements, the computing device 110 may generate the transaction GUI based on one or more characteristics of the transaction media (e.g., characteristics detected by the sensors 222, 224, 226). In some arrangements, the transaction GUI may include an interactive menu that includes one or more transaction types. In some arrangements, the user interface screen 216 is a touchscreen configured to receive touch input from a user.

The user interaction point(s) 218 include various input/output devices of the two-way cash recycler system 100. In some arrangements, the user interaction point(s) 218 may be communicatively coupled to the computing device 110 via the I/O circuit 120 and/or the media aperture control circuit 122. The user interaction point(s) 218 may include one or more of a printing device 218*a* and/or an identification device 218*b*.

The printing device 218*a* may be structured to print a transaction receipt when a transaction is completed. For example, the printing device 218*a* may print a receipt indicating a deposit amount, a withdrawal amount, a remaining funds amount, and the like. In some arrangements, the printing device may be configured to print and/or dispense pre-printed or pre-made bank cards, gift cards, and the like. In these arrangements, one or more of the cassettes may be configured to retrievably store blank cards.

The identification device 218*b* may be structured to receive an identification token. The identification (ID) token may include an alphanumeric password or personal identification number (PIN), an encrypted value, a biometric, an account identifier, and the like. The ID token may be associated with a user. In some arrangements, the computing device 110 may generate (and provide to the user interface screen 216) an identification user interface that includes a prompt for a user to provide the identification token via the identification device 218*b* before starting a transaction. In some arrangements, the identification device is structured to provide the identification token to the computing device 110. The computing device 110 may be structured to receive the ID token (e.g., via the I/O circuit 120) and parse a value from the ID token. The value may include an alphanumeric password or PIN, an encrypted value, an account number, a digitized biometric, and the like. The computing device 110 may determine the identity of the user, an account number, etc. based on the value and/or the ID token. For example, the computing device 110 may access and/or retrieve a user account and/or an account number (e.g., from a user account database communicatively coupled to the network 105) associated with the user and based on the value and/or the ID token.

Instead of or in addition to the identification device **218*b*, the user interface panel 210 may include one or more of a keypad, a card reader, a near-field communication device, and/or the like. For example, the keypad may include an alpha-numeric keyboard, a ten-key pad, a touchscreen keyboard or key pad, and the like. The keypad may be structured to receive a password, a personal identification number (PIN), and the like from a user. The card reader may include a magnetic strip reader, a security chip reader, a radio-frequency identification (RFID) reader, and the like. The card reader may be structured to receive an identification token from an identification card, a bank card (e.g., ATM card, debit card, credit card), and the like when a user provides the card to the card reader. The near-field communication device may include a RFID reader, a Bluetooth device manager, a Wi-Fi router, and the like. The near-field communication device may be structured to receive an identification key from an internet of things device such as an RFID chip, a smartphone, a smartwatch, and the like. In some arrangements, the identification device 218*b* includes a camera structured to scan a QR code from a user device. The QR code may have been previously generated at the mobile device of the user by the transaction application 132** based on any value that is included in a token, as described above.

In some arrangements, the second user interface panel 212 of FIG. 2 is configured to have the same or substantially similar structure, components, and/or function as the first user interface panel 210. For example, the second user interface panel 212 may also include a similar media aperture, user interface scree, and user interaction point(s).

Figure 4A:
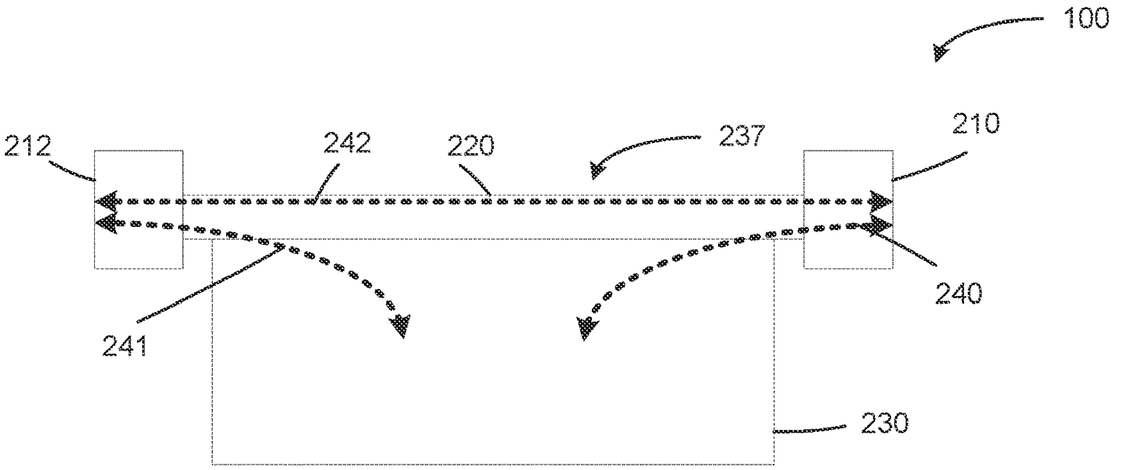
FIG. 4A is a component diagram showing a transport path for a concurrent use transaction for the two-way cash recycler system of FIG. 1, according to an example arrangement.
Figure 4B:
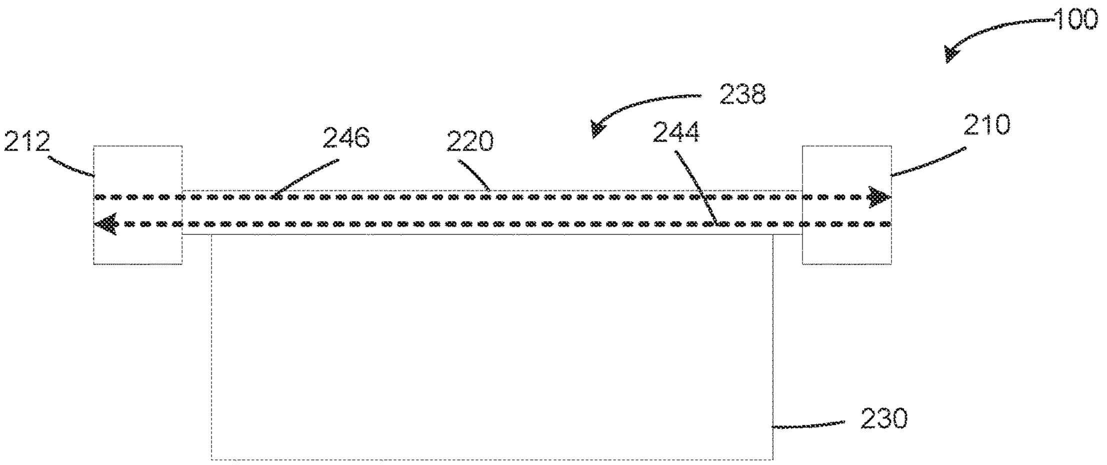
FIG. 4B is a component diagram showing a transport path for a pass-through use transaction for the two-way cash recycler system of FIG. 1, according to an example arrangement.
Figure 4C:
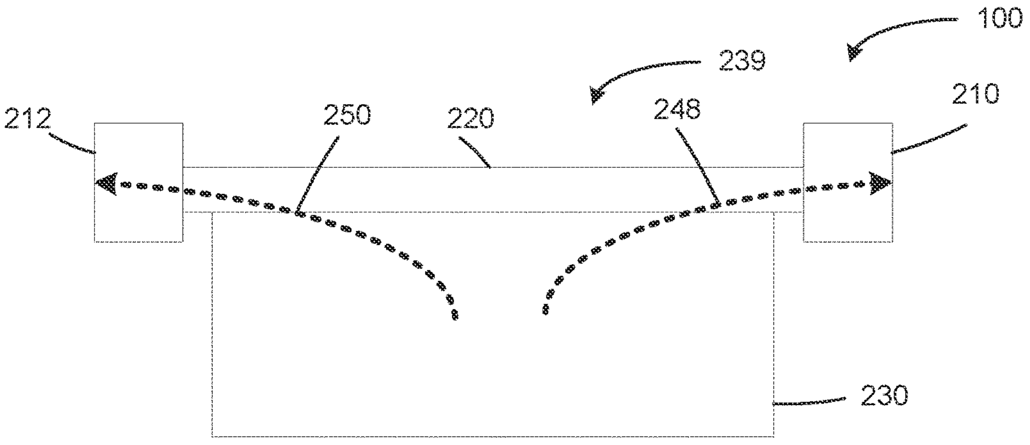
FIG. 4C is a component diagram showing a transport path for a dispensing transaction for the two-way cash recycler system of FIG. 1, according to an example arrangement.

Referring generally to FIGS. 4A-C, a plurality of pathways of the transport system 220 are shown, according to various example arrangements. Each of the plurality of pathways may be configured to directly provide and/or receive the transaction media to/from the media aperture 214 and/or the media pocket of the first user interface panel 210 and/or the second user interface panel 212. Additionally, each of the plurality of pathways may be configured to directly provide and/or receive the transaction media to/from each of the media cassettes in the vault 230, the first escrow area 234, and/or the second escrow area 236.

FIG. 4A is a component diagram showing a first pathway 237 comprising a first segment 240, a second segment 241, and a third segment 242 for a concurrent use transaction for the two-way cash recycler system 100 of FIG. 1, according to an example arrangement. The transaction can be performed as described relative to FIG. 6. A first pathway 237 of the plurality of pathways includes a concurrent use pathway structured to transport the transaction media from the first user interface panel 210 and/or the second user interface panel 212 to the vault 230 and/or the first escrow area 234. The first pathway 237 includes a first segment 240 that defines a first throat in the transport system 220. The first throat is structured to transport the transaction media from the first user interface panel 210 to the vault 230 and/or the first escrow area 234. The first pathway 237 also includes a second segment 241 that defines a second throat in the transport system 220. The second throat is structured to transport the transaction media from the second user interface panel 212 to the vault 230 and/or the first escrow area 234. The first pathway 237 also includes a third segment 242 that defines a pass-through passage that is structured to transport the transaction media between the first user interface panel 210 and the second user interface panel 212.

FIG. 4B is a component diagram showing a second pathway 238 comprising a fourth segment 244 and a fifth segment 246 for a pass-through use transaction for the two-way cash recycler of FIG. 1, according to an example arrangement. The transaction can be performed as described relative to FIG. 6. The second pathway 238 of the plurality of pathways includes a of a pass-through pathway structured to transport the transaction media between the first user interface panel 210 and the second user interface panel 212. For example, the fourth segment 244 is structured to transport the transaction media from the first user interface panel 210 to the second user interface panel 212, and the fifth segment 246 is structured to transport the transaction media from the second user interface panel 212 to the first user interface panel 210. In some arrangements, the pass-through pathway may be further structured to provide the transaction media to the vault 230 and/or the first escrow area 234 and retrieve transaction media from the vault 230 and/or the second escrow area 236.

FIG. 4C is a component diagram showing a third pathway 239 comprising a sixth segment 248 and a seventh segment 250 for a dispensing transaction for the two-way cash recycler of FIG. 1, according to an example arrangement. The transaction can be performed as described relative to FIG. 6. The third pathway 239 of the plurality of pathways includes a dispense pathway structured to transport the transaction media from the vault 230 and/or the second escrow area 236 to at least one of the first user interface panel 210 and the second user interface panel 212. For example, the sixth segment 248 is structured to transport transaction media from the vault 230 and/or the second escrow area 236 to the first user interface panel 210, and the seventh segment 250 is structured to transport transaction media from the vault 230 and/or the second escrow area 236 to the second user interface panel 212.

Figure 5:
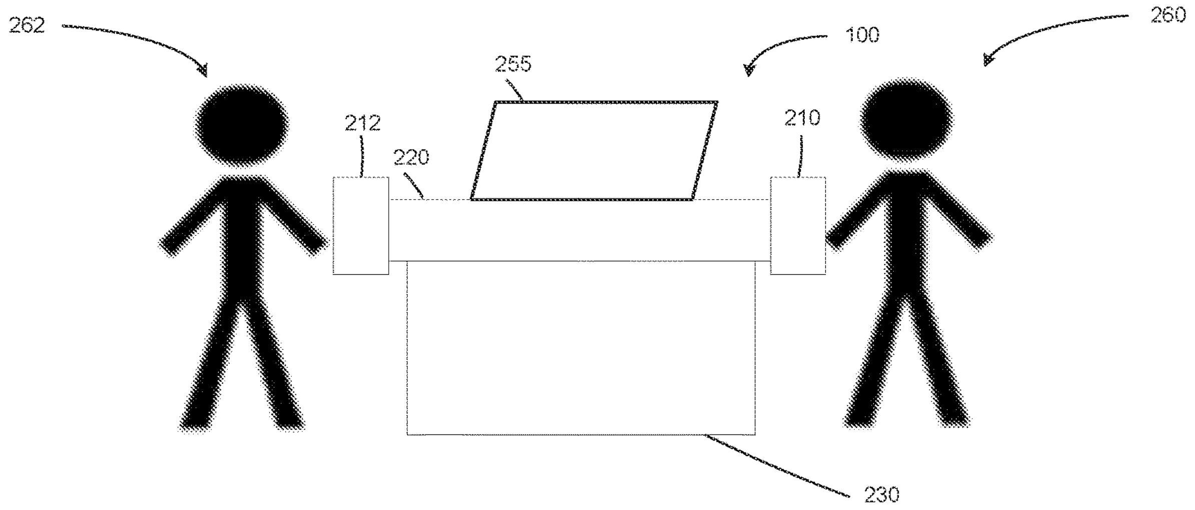
FIG. 5 is a diagram of the two-way cash recycler system of FIG. 1 showing user(s) interacting with the two-way cash recycler system, according to an example arrangement.

FIG. 5 is a component diagram of the two-way cash recycler system 100 of FIG. 1 showing user(s) 260, 262 interacting with the two-way cash recycler system 100, according to an example arrangement. In various example arrangements, the two-way cash recycler system 100 may be positioned on a service counter, freestanding in a service area, on a service desk, and/or other service areas of a business. In some arrangements, the two-way cash recycler system 100 may be structured such that a user may be in a standing or seated position. In some arrangements, and as shown in FIG. 5, the two-way cash recycler system 100 may also include a barrier 255. The barrier 255 may be structured to physically separate a first user 260 from a second user 262. In some arrangements, the barrier 255 may be transparent and/or include a communication portal such that the first user 260 and the second user may see and/or communicate with each other. In some arrangements, the barrier 255 translucent (e.g., frosted) or opaque such that the first user 260 and the second user 262 cannot see and/or communicate with each other.

In some arrangements, the service counter may include a teller counter at a bank, a checkout counter at a store (e.g., grocery store, retail store, convince store), or a counter at any service provider. In some arrangements, the two-way cash recycler system 100 may include a transparent barrier that includes a communication portal such that the first user 260 and the second user 262 may communicate with each other during a transaction.

In some arrangements, the service area may include a lobby of a bank, an service area at a store, or a serve area at any service provider. In some arrangements, the two-way cash recycler system 100 may include an opaque barrier such that the first user 260 and the second user 262 may concurrently use the two-way cash recycler system 100 without interacting with each other.

In some arrangements, the service desk may include a desk of a service provider such as a banker, a sales person, or other service provider employee. In some arrangements, the two-way cash recycler system 100 may include a transparent barrier that includes a communication portal such that the first user 260 and the second user 262 may communicate with each other during a transaction.

Figure 6:
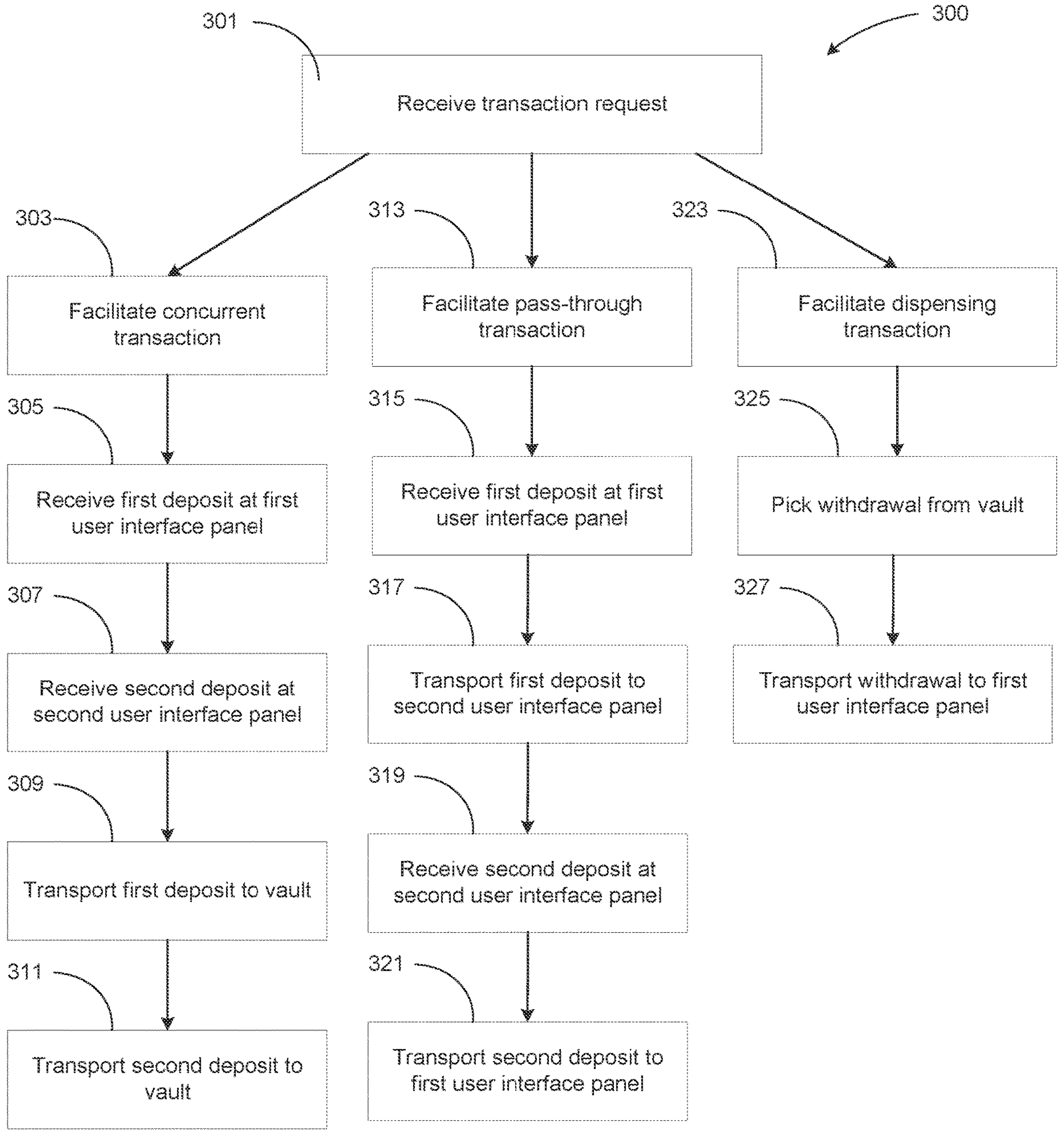
FIG. 6 is a flowchart of a method of facilitating a transaction by the two-way cash recycler system of FIG. 1, according to an example arrangement.

FIG. 6 is a flowchart of a method 300 of facilitating a transaction by the two-way cash recycler system 100 of FIG. 1, according to an example arrangement. The computing device 110 may be configured to perform method 300. For example, the computing device 110 may, alone or in combination with other devices such as the two-way cash recycler system 100, perform the method 300. Further, the method 300 may include user inputs from a user (e.g., the first user 260, the second user 262) one or more user devices (such as devices of provider employees, customers), another computing device on the network 105, an identification device (e.g., an ID card, a bank card), and the like.

In broad overview of method 300, at step 301, the computing device 110 receives a request to facilitate a transaction. At step 303, the computing device 110 initiates and facilitates a concurrent transaction. The concurrent transaction may include two different user concurrently or partially concurrently using the two-way cash recycler system 100 to perform one or more transactions such as a deposit, a withdrawal, a payment, and the like. As part of the concurrent transaction, at step 305, the two-way cash recycler system 100 receives a first deposit at the first user interface panel 210. At step 307, the two-way cash recycler system 100 receives a second deposit at the second user interface panel 212. At step 309, the two-way cash recycler system 100 transports the first deposit to the vault 230. At step 311, the two-way cash recycler system 100 transports the second deposit to the vault 230.

At step 313, the computing device 110 initiates and facilitates a pass-through transaction. The pass-through transaction may include transporting transaction media between a first user and a second user, via the transport system 220 of the two-way cash recycler system 100. In some arrangements, the transaction media is transported to the vault 230 and/or one or more of the escrow areas 229, 234, 236. In some arrangements, a first set of transaction media is transported to the first escrow area 234, and a second set of transaction media, different from the first, is transported to the first user interface panel 210 and/or the second user interface panel 212. As part of the pass-through transaction, at step 315, the two-way cash recycler system 100 receives a first deposit at the first user interface panel 210. At step 317, the two-way cash recycler system 100 transports the first deposit to the second user interface panel 212. At step 319, the two-way cash recycler system 100 receives the second deposit at the second user interface panel 212. At step 321, the two-way cash recycler system 100 transports the second deposit to the first user interface panel 210.

At step 323, the computing device 110 facilitates a dispensing transaction. The dispensing transaction may include dispensing transaction media from the vault 230 to one or more of the first user interface panel 210 and the second user interface panel 212 during a withdrawal transaction. As part of the dispensing transaction, at step 325, the two-way cash recycler system 100 picks a withdrawal from the vault 230. At step 327, the two-way cash recycler system 100 transports the withdrawal to the first user interface panel 210.

Referring to method 300 in more detail, at step 301, the computing device 110 receives a transaction request. The transaction request may include one or more of a concurrent use transaction, a pass-through transaction, and a dispensing transaction. In some arrangements, the computing device 110 may be configured to follow the steps 303-311, 313-321, and 323-327 according to the transaction request. For example, the computing device 110 may be configured to move to step 303 based on the request indicating a concurrent use transaction, step 313 based on the request indicating a pass-through transaction, and 323 based on the request indicating a dispensing transaction. In some arrangements, the transaction request may indicate a more than one transaction type to be executed concurrently, partially concurrently, or sequentially. Accordingly, the computing device 110 may be configured to follow the steps 303-311, 313-321, and 323-327 concurrently, partially concurrently, or sequentially, according to the transaction request.

In some arrangements, at step 301, the computing device 110 is configured to verify the identity of one or more users of the two-way cash recycler system 100. For example, the computing device 110 may be configured to prompt, via the user interface screen 216, a user to input an identification token. The computing device may receive the identification token via one or more of the user interaction point(s) 218.

At step 303, the computing device 110 facilitates a concurrent use transaction. In some arrangements, the computing device 110 is configured to utilize transaction application(s) 132. In an example arrangement, a first instance of the transaction application(s) 132 is displayed on the user interface screen 216 of the first user interface panel 210. The first instance may prompt a first user to verify the identity of the first user via the identification device 218*b*. The first user may provide an identification token via a mobile device such as a smart phone (e.g., by transmitting the ID token via Bluetooth, NFC, and the like, by providing the ID token in the form of a scannable code such as a QR code, a bar code, and the like), a card (e.g., an ID card, a bank card), a biometric input (e.g., rental scan, fingerprint scan, face ID), an alpha-numeric password, and the like. The first user may select, via the first user interface panel 210, a transaction type including a deposit, a withdrawal, a payment, and the like. The first user interface panel 210 may display one or more transaction parameters and request a user input and/or user verification for the transaction type. The transaction parameters may include a deposit media type (e.g., cash or checks), a withdrawal amount (e.g., a cash value), a payment amount (e.g., a payment total), and/or other parameters related to the selected transaction type. The first user may input and/or verify transaction parameters via the first user interface panel 210. A second instance of the transaction application(s) 132 may be provided on a screen of the second user interface panel 212. Concurrently (or partially concurrently) with the first user, a second user may also provide an ID token when prompted. Concurrently (or partially concurrently) with the first user, the second user may also select a transaction type and input and/or verify transaction parameters.

At step 305, the two-way cash recycler system 100 receives a first deposit at the first user interface panel 210. The first deposit may include any combination of transaction media. In some arrangements, the first deposit is received at the media aperture 214 and/or a media pocket. In some arrangements, one or more sensors 222, 224, 226 detect one or more characteristics of the transaction media in the first deposit.

At step 307, the two-way cash recycler system 100 receives a second deposit at the second user interface panel 212. The second deposit may include any combination of transaction media. In some arrangements, the second deposit is received at the media aperture 214 and/or a media pocket of the second user interface panel 212. In some arrangements, one or more sensors 222, 224, 226 detect one or more characteristics of the transaction media in the second deposit.

At step 309, the transport system 220 transports the first deposit to the vault 230. In some arrangements, the first deposit is transported via a first throat of the transport system 220. In some arrangements, a picker system of the transport system 220 is configured to retrieve the first deposit from the first user interface panel 210. In some arrangements, a picker system of the transport system 220 is configured to sort the transaction media of the first deposit by providing each unique transaction media to a predetermined cassette of the cassettes 232. In some arrangements, one or more sensors 222, 224, 226 detect one or more characteristics of the transaction media in the first deposit during transportation. In some arrangements, the transport system 220 is configured to pass each of the transaction media past the UV light source 228.

At step 311, the transport system 220 transports the second deposit to the vault 230. In some arrangements, the second deposit is transported via a second throat of the transport system 220. In some arrangements, a picker system of the transport system 220 is configured to retrieve the second deposit from the second user interface panel 212. In some arrangements, a picker system of the transport system 220 is configured to sort the transaction media of the second deposit by providing each unique transaction media to a predetermined cassette of the cassettes 232. In some arrangements, one or more sensors 222, 224, 226 detect one or more characteristics of the transaction media in the first deposit during transportation. In some arrangements, the transport system 220 is configured to pass each of the transaction media past the UV light source 228.

In some arrangements, at step 309 and/or 311 the transport system 220 is configured to selectively transport the transaction media to one or more of the cassettes 232, the first escrow area 234, and/or the second escrow area 236 based on the media type. For example, banknotes may be transported to one of the plurality of cassettes 232, checks may be transported to the first escrow area, and payment tickets and other transaction media may be transported to the second escrow area.

At step 313, the computing device 110 facilitates a pass-through transaction. In some arrangements, the computing device 110 is configured to utilize the transaction application(s) 132. In an example arrangement, a first instance of the transaction application(s) 132 is displayed on the user interface screen 216 of the first user interface panel 210. The first instance may prompt a first user (e.g., a customer) to verify the identity of the first user via the identification device **218*b*. The first user may provide an identification token via a mobile device such as a smart phone, a card, a biometric input, an alpha-numeric password, and the like. The first user may select, via the first user interface panel 210, a transaction type including a pass-through exchange or a pass-through payment. The first user interface panel 210 may display one or more transaction parameters and request a user input and/or user verification for the transaction type. The transaction parameters may include an exchange type (e.g., checks or money orders for cash), a payment amount (e.g., a payment total), and/or other parameters related to the selected transaction type. The first user may input and/or verify transaction parameters via the first user interface panel 210. A second instance of the transaction application(s) 132 may be provided on a screen of the second user interface panel 212. Concurrently (or partially concurrently) with the first user, a second user (e.g., a provider employee) may also provide an ID token when prompted. The screen of the second user interface panel 212 may display each of the parameters of the transaction and/or indicate steps for the second user to perform to complete the transaction. For example, in a payment transaction, the payment amount may include a payment for a first amount (e.g., 7 dollars), and first user may indicate, via a user input, that the first user will provide a second amount (e.g., 10 dollars). The second instance of the transaction application (s) 132 may provide an indication of the screen of the second user interface panel 212 to provide a third amount (e.g., 3 dollars) to the first user, via the two-way cash recycler system 100**.

At step 315, the two-way cash recycler system 100 receives a first deposit at the first user interface panel 210. The first deposit may include any combination of transaction media. In some arrangements, the first deposit is received at the media aperture 214 and/or a media pocket. In some arrangements, one or more sensors 222, 224, 226 detect one or more characteristics of the transaction media in the first deposit.

At step 317, the transport system 220 transports the first deposit to the second user interface panel 212. In some arrangements, the first deposit is transported via a pass-through passage of the transport system 220. In some arrangements, a picker system of the transport system 220 is configured to retrieve the first deposit from the first user interface panel 210. In some arrangements, a picker system of the transport system 220 is configured provide the transaction media to the second user interface panel 212. In some arrangements, one or more sensors 222, 224, 226 detect one or more characteristics of the transaction media in the first deposit during transportation. In some arrangements, the transport system 220 is configured to pass each of the transaction media past the UV light source 228.

At step 319, the two-way cash recycler system 100 receives a second deposit at the second user interface panel 212. The second deposit may include any combination of transaction media. In some arrangements, the second deposit is received at the media aperture 214 and/or a media pocket of the second user interface panel 212. In some arrangements, one or more sensors 222, 224, 226 detect one or more characteristics of the transaction media in the second deposit.

At step 321, the transport system 220 transports the second deposit to the first user interface panel 210. In some arrangements, the second deposit is transported via a pass-through passage of the transport system 220. In some arrangements, a picker system of the transport system 220 is configured to retrieve the second deposit from the second user interface panel 212. In some arrangements, a picker system of the transport system 220 is configured provide the transaction media to the first user interface panel 210. In some arrangements, one or more sensors 222, 224, 226 detect one or more characteristics of the transaction media in the first deposit during transportation. In some arrangements, the transport system 220 is configured to pass each of the transaction media past the UV light source 228.

At step 323, the computing device 110 facilitates a dispensing transaction. In some arrangements, the computing device 110 is configured to utilize the transaction application(s) 132. In an example arrangement, a first instance of the transaction application(s) 132 is displayed on the user interface screen 216 of the first user interface panel 210. The first instance may prompt a first user to verify the identity of the first user via the identification device 218*b*. The first user may provide an identification token via a mobile device such as a smart phone, a card, a biometric input, an alpha-numeric password, and the like. The first user may select, via the first user interface panel 210, a transaction type including a withdrawal. The first user interface panel 210 may display one or more transaction parameters and request a user input and/or user verification for the transaction type. The transaction parameters may include a withdrawal amount, a transaction media type (e.g., types of banknotes), and/or other parameters related to the selected transaction type. The first user may input and/or verify transaction parameters via the first user interface panel 210. A second instance of the transaction application(s) 132 may be provided on a screen of the second user interface panel 212. Concurrently (or partially concurrently) with the first user, a second user may also provide an ID token when prompted. Concurrently (or partially concurrently) with the first user, the second user may also select a transaction type and input and/or verify transaction parameters.

At step 325, the transport system 220 retrieves a withdrawal from the vault 230. The withdrawal may include any combination of transaction media. In some arrangements, the transport system 220 is configured to retrieve transaction media from the vault based on a user input (e.g., a total amount of cash, a predetermined quantity of one or more banknotes). In some arrangements, a picking system of the transport system 220 is configured to pick each of the transaction media from the cassettes 232.

At step 327, the transport system 220 transports the withdrawal to the first user interface panel 210. In some arrangements, the withdrawal is transported via a dispensing passage of the transport system 220. In some arrangements, a picker system of the transport system 220 is configured provide the transaction media to the first user interface panel 210. In some arrangements, one or more sensors 222, 224, 226 detect one or more characteristics of the transaction media in the first deposit during transportation. In some arrangements, the transport system 220 is configured to pass each of the transaction media past the UV light source 228.

Figure 7:
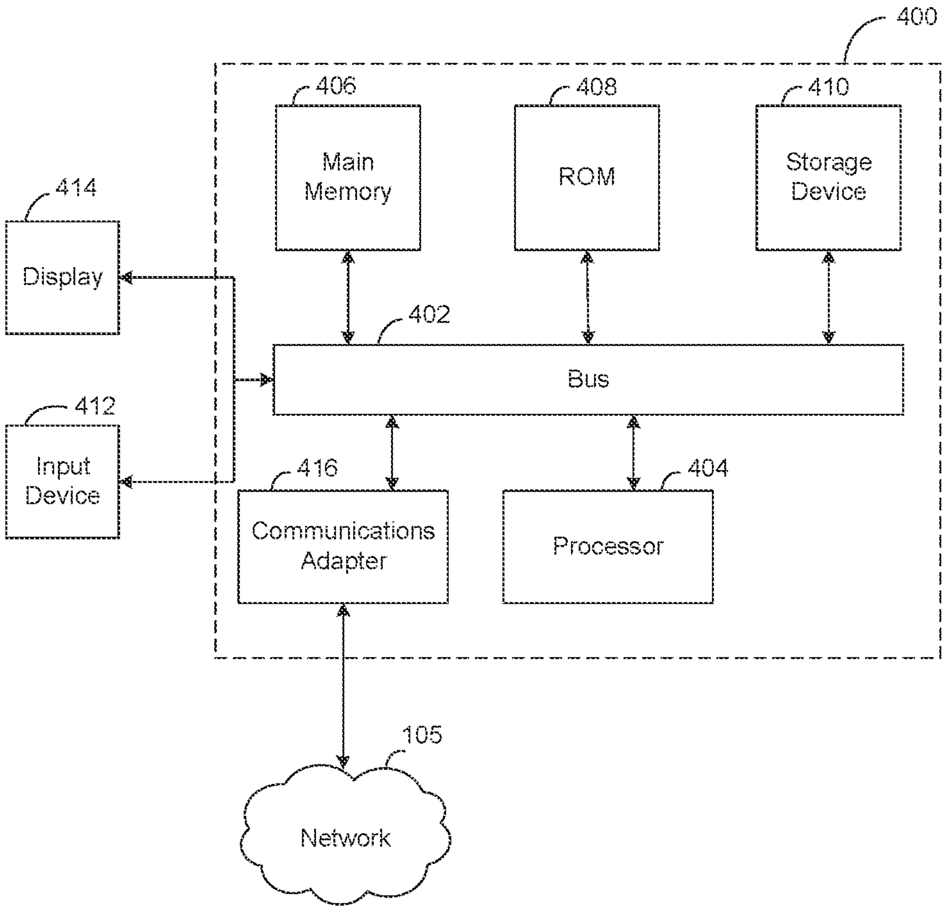
FIG. 7 is a component diagram of an example computing system suitable for use in the various arrangements described herein.

FIG. 7 is a component diagram of an example computing system 400 suitable for use in the various arrangements described herein. For example, the computing system 400 may implement an example computing device 110, an example training computing device 210, and/or various other example systems and devices described in the present disclosure.

The computing system 400 includes a bus 402 or other communication component for communicating information and a processor 404 coupled to the bus 402 for processing information. The computing system 400 also includes main memory 406, such as a random access memory (RAM) or other dynamic storage device, coupled to the bus 402 for storing information, and instructions to be executed by the processor 404. Main memory 406 can also be used for storing position information, temporary variables, or other intermediate information during execution of instructions by the processor 404. The computing system 400 may further include a read only memory (ROM) 408 or other static storage device coupled to the bus 402 for storing static information and instructions for the processor 404. A storage device 410, such as a solid state device, magnetic disk or optical disk, is coupled to the bus 402 for persistently storing information and instructions.

The computing system 400 may be coupled via the bus 402 to a display 414, such as a liquid crystal display, or active matrix display, for displaying information to a user. An input device 412, such as a keyboard including alphanumeric and other keys, may be coupled to the bus 402 for communicating information, and command selections to the processor 404. In another arrangement, the input device 412 has a touch screen display. The input device 412 can include any type of biometric sensor, a cursor control, such as a mouse, a trackball, or cursor direction keys, for communicating direction information and command selections to the processor 404 and for controlling cursor movement on the display 414.

In some arrangements, the computing system 400 may include a communications adapter 416, such as a networking adapter. Communications adapter 416 may be coupled to bus 402 and may be configured to enable communications with a computing or communications network 105 and/or other computing systems. In various illustrative arrangements, any type of networking configuration may be achieved using communications adapter 416, such as wired (e.g., via Ethernet), wireless (e.g., via Wi-Fi, Bluetooth), satellite (e.g., via GPS) pre-configured, ad-hoc, LAN, WAN, and the like.

According to various arrangements, the processes that effectuate illustrative arrangements that are described herein can be achieved by the computing system 400 in response to the processor 404 executing an arrangement of instructions contained in main memory 406. Such instructions can be read into main memory 406 from another computer-readable medium, such as the storage device 410. Execution of the arrangement of instructions contained in main memory 406 causes the computing system 400 to perform the illustrative processes described herein. One or more processors in a multi-processing arrangement may also be employed to execute the instructions contained in main memory 406. In alternative arrangements, hard-wired circuitry may be used in place of or in combination with software instructions to implement illustrative arrangements. Thus, arrangements are not limited to any specific combination of hardware circuitry and software.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, and the like. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), and the like. In some embodiments, the non-volatile media may take the form of ROM, flash memory (e.g., flash memory such as NAND, 3D NAND, NOR, 3D NOR), EEPROM, MRAM, magnetic storage, hard discs, optical discs, and the like. In other embodiments, the volatile storage media may take the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A transaction system comprising:
a vault structured to store, receive, and dispense transaction media;
a first input/output device structured to receive and dispense the transaction media;
a second input/output device structured to receive and dispense the transaction media; and
a transport system structured to transport the transaction media within the transaction system using one or more pathways, the one or more pathways connecting the first input/output device to at least one of the second input/output device or the vault;
wherein the vault comprises:
a first escrow area having one or more first cassettes structured to store the transaction media and dispense and receive the transaction media via the transport system to and from the first input/output device; and
a second escrow area having one or more second cassettes, different than the one or more first cassettes, the one or more second cassettes structured to store the transaction media and dispense and receive the transaction media via the transport system to and from the second input/output device.

2. The system of claim 1, wherein the transport system comprises a picking system structured to pick the transaction media from the vault and provide the transaction media to at least one of the first input/output device or the second input/output device.

3. The system of claim 2, wherein the picking system comprises at least one of:
a first picker structured to pick the transaction media from the vault and provide the transaction media to the first input/output device; or
a second picker structured to pick the transaction media from the vault and provide the transaction media to the second input/output device.

4. The system of claim 1, wherein the one or more pathways comprises at least one of:
a first pathway structured to transport the transaction media between the first input/output device and the second input/output device;
a second pathway structured to transport the transaction media from at least one of the first input/output device or the second input/output device to the vault; or
a third pathway structured to transport the transaction media from the vault to at least one of the first input/output device or the second input/output device.

5. The system of claim 1, wherein the transport system is further structured to transport the transaction media past an ultraviolet light source disposed within the transport system.

6. The system of claim 1, wherein the transport system comprises:
a first throat structured to transport the transaction media from the first input/output device to the vault; and
a second throat structured to transport the transaction media from the second input/output device to the vault.

7. The system of claim 1, wherein:
the transaction media comprises at least one of banknotes, coins, checks, or payment tickets;
the vault houses a plurality of media cassettes therein, the plurality of media cassettes comprises at least one banknote cassette for each type of banknote; and
the transport system is further structured to sort the banknotes into the at least one banknote cassette.

8. The system of claim 1, further comprising:
a check holding area structured to store and receive checks, the check holding area having an optical character recognition sensor coupled thereto and structured to determine at least a routing number, an account number, and a value for each of the checks; and
a payment ticket holding area structured to store and receive payment tickets.

9. The system of claim 1, wherein the first input/output device comprises a first pocket structured to receive the transaction media in any orientation, combination, and order and provide the transaction media to the transport system.

10. The system of claim 1, wherein the first input/output device further comprises an identification device structured to verify an identity of a user.

11. The system of claim 10, wherein the identification device comprises at least one of (i) a keypad structured to receive a personal identification number (ii) a card reader structured to read at least one of an identification card or a bank card, or (iii) a near-field communication device structured to receive an identification key.

12. The system of claim 1, further comprising processing circuitry structured to:
facilitate, by the transport system, a concurrent transaction for a first user on a first side of the transaction system and a second user on a second side of the transaction system;
facilitate, by the transport system, a pass-through transaction for the first user and the second user; and
facilitate, by the transport system, a dispensing transaction for the first user.

13. A method of facilitating a transaction comprising:
facilitating, by a transaction device, at least one of a plurality of transaction types, the plurality of transaction types comprising:
a first transaction type comprising:
receiving, by a first input/output device of the transaction device, a first set of transaction media,
receiving, by a second input/output device of the transaction device, a second set of transaction media, and
transporting, by a transport system, the first set of transaction media and the second set of transaction media to a media vault; and
a second transaction type comprising:
receiving, by the first input/output device, a third set of transaction media, and
transporting, by the transport system, the third set of transaction media from the first input/output device to the second input/output device;
wherein the media vault comprises at least one of:
a plurality of media cassettes structured to store, receive, and dispense banknotes, each of the plurality of media cassettes structured to receive a unique banknote type;
a check holding area structured to receive checks and having a check OCR sensor coupled thereto, the check OCR sensor structured to detect a routing number, an account number, and a value for each of the checks received by the check holding area; and
a payment ticket holding area structured to receive and store tickets therein.

14. The method of claim 13, wherein the method further comprises:

receiving, by the transport system, a plurality of transaction media, the plurality of transaction media including at least one of the first set of transaction media, the second set of transaction media, or the third set of transaction media; and detecting, by an optical character recognition (OCR) sensor, a media type for each of the plurality of transaction media when the transport system receives a transaction media from at least one of the first input/output device or the second input/output device.

15. The method of claim 14, wherein the media type includes at least one of banknotes, coins, checks, or payment tickets.

16. The method of claim 14, wherein facilitating the second transaction type further comprises:

transporting, by the transport system, the first set of transaction media and the second set of transaction media to the media vault via a concurrent use pathway, the concurrent use pathway including:

a first throat structured to transport the first set of transaction media from the first input/output device to a first escrow area of the media vault; and a second throat structured to transport the second set of transaction media from the second input/output device to a second escrow area of the media vault.

17. A non-transitory computer readable medium having computer-executable instructions embodied therein that, when executed by at least one processor of a computing system, cause the computing system to perform operations to complete a transaction, the operations comprising:

performing concurrent transaction operations, the concurrent transaction operations including:

receiving a first deposit notification from a first input/output device sensor, the first deposit notification indicating that a first transaction media was placed in a first input/output device;

receiving a second deposit notification from a second input/output device sensor, the second deposit notification indicating that a second transaction media was placed in a second input/output device; and causing a transport system to transport the first transaction media and the second transaction media to a media vault; and performing pass-through transaction operations, the pass-through transaction operations including:

receiving a third deposit notification from the first input/output device sensor, the third deposit notification indicating that a third transaction media was placed in the first input/output device; and causing the transport system to transport the third transaction media from the first input/output device to the second input/output device.

18. The non-transitory computer readable medium of claim 17, wherein the operations further comprise:

causing the transport system to transport a plurality of transaction media to a sensor escrow area, the plurality of transaction media including at least one of the first transaction media, the second transaction media, or the third transaction media;

receiving a media data packet from at least one media sensor in the sensor escrow area, the media data packet including an image of at least one of the transaction media;

performing optical character recognition (OCR) operations on the image of at least one of the transaction media; and determining, based on the OCR operations, at least one of a media type, a media value, a media verification, a media routing number, and a media account number for each of the plurality of transaction media.

19. The non-transitory computer readable medium of claim 17, wherein the operations further comprise:

receiving, via an identification device, a first identifier token, wherein the identification device includes at least one of:

a keypad structured to receive the first identifier token as a personal identification number;

a near-field communication device structured to receive the first identifier token from an internet of things device; and a card reader structured to receive the first identifier token from at least one of an identification card and a bank card; and verifying an identity of a first user based on the first identifier token.

* * * * *